(12) United States Patent
Cai et al.

(10) Patent No.: US 8,306,006 B2
(45) Date of Patent: Nov. 6, 2012

(54) RESOURCE ALLOCATION / MANAGEMENT METHOD AND DEVICE BASED ON BLOCK REPEAT DIVISION MULTIPLE ACCESS

(75) Inventors: Yuemin Cai, Beijing (CN); Yingmin Wang, Beijing (CN); Shaohui Sun, Beijing (CN); Hai Tang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 191 days.

(21) Appl. No.: 12/680,873

(22) PCT Filed: Sep. 28, 2008

(86) PCT No.: PCT/CN2008/072590
§ 371 (c)(1),
(2), (4) Date: Mar. 30, 2010

(87) PCT Pub. No.: WO2009/046677
PCT Pub. Date: Apr. 16, 2009

(65) Prior Publication Data
US 2010/0214915 A1    Aug. 26, 2010

(30) Foreign Application Priority Data

Sep. 30, 2007   (CN) .......................... 2007 1 0151359
Oct. 30, 2007   (CN) .......................... 2007 1 0164390

(51) Int. Cl.
*H04W 4/00* (2009.01)
(52) U.S. Cl. .................. 370/341; 370/203; 375/260
(58) Field of Classification Search ......... 370/203–210, 370/328, 329, 330, 332, 335–349; 375/260–265
See application file for complete search history.

(56) References Cited

U.S. PATENT DOCUMENTS

| 2005/0271151 A1 | 12/2005 | Cho et al. | |
| 2007/0268860 A1* | 11/2007 | Taneja | 370/329 |
| 2008/0049851 A1* | 2/2008 | Nangia et al. | 375/260 |

FOREIGN PATENT DOCUMENTS

| CN | 1725746 A | 1/2006 |
| CN | 1909537 A | 2/2007 |
| JP | 2004-200856 | 7/2004 |
| JP | 2005-117579 | 4/2005 |
| JP | 2006100887 A | 4/2006 |
| JP | 2006311465 | 11/2006 |
| WO | 2006137708 A1 | 12/2006 |

OTHER PUBLICATIONS

Catt, Ritt, A Technique to Enhance the Cell Edge Performance[online], 3GPP TSG RAN WG1 #54, Jeju, Korea, Aug. 18-22, 2008.
JP 2010-526141, May 16, 2012, Japanese Office Action.

* cited by examiner

*Primary Examiner* — Ricky Ngo
*Assistant Examiner* — Kan Yuen
(74) *Attorney, Agent, or Firm* — Workman Nydegger

(57) ABSTRACT

A resource allocation method based on block repeat division multiple access, involves the steps of: distributing the usable BRBG according to the service requirement of a user; distributing RC series for the said distributed BRBG. The present invention also provides a resource management method based on block repeat division multiple access, which involves the steps of: detecting the operation environment in a district for a period of time; adjusting the number of the BRB in the BRBG of the district, according to the operation environment of the district. The present invention also provides the resource allocation/management device based on block repeat division multiple access.

4 Claims, 6 Drawing Sheets

RESOURCE ALLOCATION / MANAGEMENT METHOD AND DEVICE BASED ON BLOCK REPEAT DIVISION MULTIPLE ACCESS

This application claims the benefit of Chinese Patent Application No. 200710151359.9, titled "Resource Allocation/Management Method and Device based on Block Repeat Division Multiple Access", filed with the China Patent Office on Sep. 30, 2007, and claims the benefit of Chinese Patent Application No. 200710164390.6, titled "Resource Allocation/Management Method and Device based on Block Repeat Division Multiple Access", filed with the China Patent Office on Oct. 30, 2007, which are incorporated herein by reference in their entirety.

FIELD OF THE INVENTION

The present invention relates to the field of resource management in mobile communication systems, and in particular, to a resource allocation/management method and device based on Block Repeat Division Multiple Access, and a base station employing the resource allocation/management method.

BACKGROUND OF THE INVENTION

Orthogonal Frequency-Division Multiplexing (OFDM) is widely used in future communication systems as a basic technology for the air interface.

In the modulation scheme of OFDM, .multi-user multiplexing and multiple access are achieved by using a number of orthogonal sub-carriers in one OFDM symbol. In OFDM systems, sub-carriers allocated for different users in the same cell are orthogonal to each other, thereby avoiding multi-access interference. However, when adjacent cells operate on the same frequency, users between the cells, especially those who at edges of the cells, will suffer co-channel interference, which leads to a severe deterioration of in communication quality of the users.

To solve the problem above, "Block Repeat Division Multiple Access" is proposed as a new and efficient multiple access scheme. Information transmission based on Block Repeat (BR) is referred to as block repeat transmission. Multiplexing based on block repeat is referred to as Block Repeat Division Multiplexing (BRDM). Multiple access based on block repeat is referred to as Block Repeat Division Multiple Access (BRDMA). The combination of BRDMA and OFDM can be referred to as Block Repeat-Orthogonal Frequency-Division Multiplexing (BR-OFDM) or Block Repeat-Orthogonal Frequency-Division Multiple Access (BR-OFDMA).

In BR-OFDM, a data block unit is modulated and mapped into a basic Block Unit (BU); the basic block unit is weighted and repeated according to the number of modulation repetitions and a group of repeated block units are obtained. By multiplying of the data block unit in the basic block unit by a group of weighting factors and repeat modulation, a group of repeated block units can be obtained, and thereby realizing weighting and repetition of a group of basic block units. The number of modulation repetitions is referred to as a Repeat Factor (RF), and the set of weighting factors are referred to as a block repeat weighting factor sequence, or a Repeat Code (RC) sequence. The time-frequency resource taken by a repeat block unit is referred to as a Block repeat Resource Block (BRB) which can carry one data block; multiple BRBs constitute a Block repeat Resource Block Group (BRBG) corresponding to multiple data blocks.

When multiple users share the same time-frequency resource to transmit repeated block units, different RC sequences are used for each user in weighting. The receiver can separate repeated block units of different users according their unique RC sequences. Therefore, interference between users of adjacent cells operating on the same time frequency recourses can be reduced, and reliability of signal transmission can be improved.

However, there is no explicit BRDMA based resource allocation/management method been proposed.

SUMMARY OF THE INVENTION

Therefore, a technical problem solved by the present invention is to provide a BRDMA based resource allocation/management method, to solve the resource allocation/management problem under BRDMA.

Another technical problem solved by the present invention is to provide a BRDMA based resource allocation/management device.

The technical solution provided by the present invention is described as follows.

A BRDMA based resource allocation method, includes:
  allocating an available BRBG according to a service requirement of a user;
  assigning a RC sequence for the BRBG.

Preferably, a BRBG having a RF meeting the service requirement of the user is selected from the available BRBG, and the selected BRBG is allocated.

In an embodiment, if the available BRBG does not include a BRBG having a RF meeting the service requirement of the user, a BRBG having a RF higher than the service requirement of the user is selected, and the selected BRBG is allocated.

In an embodiment, if the available BRBG does not include a BRBG having a RF meeting the service requirement of the user, a RF of a BRBG having a RF higher than the service requirement of the user is lowered to obtain a BRBG having a RF meeting the service requirement of the user, and the obtained BRBG is allocated.

In an embodiment, if the available BRBG does not include a BRBG having a RF meeting the service requirement of the user, a RF of a BRBG is increased to obtain a BRBG having a RF meeting the service requirement of the user, and the obtained BRBG is allocated.

In an embodiment, the available BRBG does not include a BRBG having a RF meeting the service requirement of the user, a plurality of available BRBGs are selected, the sum of RFs of the available BRBGs meeting the service requirement of the user, and the plurality of available BRBGs are allocated.

In an embodiment, a plurality of available RC sequences are selected from RC sequences corresponding to RFs of the allocated plurality of available BRBGs, the selected plurality of RC sequences are concatenated in the same order as the plurality of BRBGs are allocated, to obtain a concatenated RC sequence, and the concatenated RC sequence is assigned.

In an embodiment, an available RC sequence is selected from a group of RC sequences corresponding to a RF of an allocated BRBG, and the selected RC sequence is assigned.

In an embodiment, the allocated BRBG is used to transmit an uplink signal.

Preferably, time domain BRBGs are allocated preferentially, and if time domain BRBGs do not meet the requirement, continuous frequency domain BRBGs are allocated preferentially.

The service requirement includes: a requirement of service data rate, or Quality of Service (QoS).

The BRBG includes RF of Block Repeat Blocks (BRBs), RF being a repeat factor of the BRBG.

A BRB includes at least one Physical Resource Block (PRB), and the size of the BRB corresponds to the size of a block unit of block repeat modulation.

Preferably, allocation of BRBGs between adjacent cells are the same, if the allocation of BRBGs of a cell changes, a neighboring cell is informed of the changed allocation of BRBGs of the cell; and the neighboring cell updates its allocation of BRBGs accordingly.

A BRDMA based resource allocation device, includes:
a BRBG allocation unit, adapted to allocate an available BRBG according to a service requirement of a user; and
a RC sequence assignment unit, adapted to assign a RC sequence for the BRBG.

Preferably, the BRBG allocation unit is adapted to select a BRBG having a RF meeting the service requirement of the user from the available BRBG, and allocate the selected BRBG.

In an embodiment, the device further includes a determination unit, adapted to determine whether the available BRBG includes a BRBG having a RF meeting the service requirement of the user;
and if the available BRBG includes a BRBG having a RF meeting the service requirement of the user, trigger the BRBG allocation unit to operate;
if the available BRBG does not include a BRBG having a RF meeting the service requirement of the user, trigger another operation.

In an embodiment, the device further includes a first allocation unit, adapted to select a BRBG having a RF higher than the service requirement of the user, and to allocate the selected BRBG, when the available BRBG does not include a BRBG having a RF meeting the service requirement of the user.

In an embodiment, the device further includes a second allocation unit, adapted to lower a RF of a BRBG having a RF higher than the service requirement of the user to obtain a BRBG having a RF meeting the service requirement of the user, and allocate the obtained BRBG, when the available BRBG does not include a BRBG having a RF meeting the service requirement of the user.

In an embodiment, the device further includes a third allocation unit, adapted to increase a RF of a BRBG to obtain a BRBG having a RF meeting the service requirement of the user, and allocate the obtained BRBG, when the available BRBG does not include a BRBG having a RF meeting the service requirement of the user.

In an embodiment, the device further includes a fourth allocation unit, adapted to select a plurality of available BRBGs, the sum of RFs of the available BRBGs meeting the service requirement of the user, and allocate the plurality of available BRBGs, when the available BRBG does not include a BRBG having a RF meeting the service requirement of the user.

In an embodiment, the RC sequence assignment unit is adapted to select a plurality of available RC sequences from RC sequences corresponding to RFs of the allocated plurality of available BRBGs, concatenate the selected plurality of RC sequences in the same order as the plurality of BRBGs are allocated, to obtain a concatenated RC sequence, and assign the concatenated RC sequence.

In an embodiment, the RC sequence assignment unit is adapted to select an available RC sequence from a group of RC sequences corresponding to a RF of an allocated BRBG, and assign the selected RC sequence.

A BRDMA based resource management method, includes:
detecting an operating environment of a cell in a period of time;
adjusting the number of BRBs in BRBGs of the cell according to the operating environment of the cell.

In an embodiment, an average of an operating load of the cell over the period of time is calculated; and if the average of the operating load of the cell is larger than a first threshold, the number of BRBs in BRBGs is reduced; if the average of the operating load of the cell is less than a second threshold, the number of BRBs in BRBGs is increased.

In an embodiment, an average of measured interference of the cell over the period of time is calculated; and if the average of the measured interference of the cell is larger than a third threshold, the number of BRBs in BRBGs is increased; if the average of the measured interference of the cell is less than a fourth threshold, the number of BRBs in BRBGs is reduced.

In an embodiment, RFs of a part of the BRBGs are increased to increase the number of BRBs for repeat modulation.

In an embodiment, the method further includes: updating a RC sequence group of a BRBG having an increased RF.

In an embodiment, after a RF of a BRBG is increased, a RC sequence group corresponding to the increased RF is determined, and a RC sequence group of the BRBG is updated with the corresponding RC sequence group.

In an embodiment, RFs of a part of the BRBGs are lowered to reduce the number of BRBs for repeat modulation.

In an embodiment, the method further includes: updating a RC sequence group of a BRBG having a lowered RF.

In an embodiment, after a RF of a BRBG is lowered, a RC sequence group corresponding to the lowered RF is determined, and a RC sequence group of the BRBG is updated with the corresponding RC sequence group.

A BRDMA based resource management device, includes:
a detection unit, adapted to detect an operating environment of a cell in a period of time;
an adjustment unit, adapted to adjust the number of BRBs in BRBGs of the cell according to the operating environment of the cell.

In an embodiment, the detection unit is adapted to calculate an average of an operating load of the cell over the period of time; and the adjustment unit is adapted to reduce the number of BRBs in BRBGs if the average of the operating load of the cell is larger than a first threshold; and to increase the number of BRBs in BRBGs if the average of the operating load of the cell is less than a second threshold.

In an embodiment, an average of measured interference of the cell over the period of time is calculated; and the adjustment unit is adapted to increase the number of BRBs in BRBGs if the average of the measured interference of the cell is larger than a third threshold; and to reduce the number of BRBs in BRBGs if the average of the measured interference of the cell is less than a fourth threshold.

In an embodiment, the adjustment unit is adapted to increase RFs of a part of the BRBGs to increase the number of BRBs for repeat modulation.

In an embodiment, the device further includes a first RC sequence update unit, adapted to update a RC sequence group of a BRBG having an increased RF.

In an embodiment, the first RC sequence update unit is adapted to, after a RF of a BRBG is increased, determine a RC sequence group corresponding to the increased RF, and update a RC sequence group of the BRBG with the corresponding RC sequence group.

In an embodiment, the adjustment unit is adapted to lower RFs of a part of the BRBGs to reduce the number of BRBs for repeat modulation.

In an embodiment, the device further includes a second RC sequence update unit, adapted to update a RC sequence group of a BRBG having a lowered RF.

In an embodiment, the second RC sequence update unit is adapted to, after a RF of a BRBG is lowered, determine a RC sequence group corresponding to the lowered RF, and update a RC sequence group of the BRBG with the corresponding RC sequence group.

Therefore, the invention provides an explicit BRDMA based resource allocation/management solution, solving the resource allocation/management problem in BRDMA. Using the resource allocation/management solution provided by the invention, time and frequency resources can be effectively utilized, and reliability of communication for users can be improved. In addition, the resource allocation/management solution can flexibly and effectively coordinate the relation between user communication reliability and cell capacity.

BRIEF DESCRIPTION OF THE DRAWINGS

FIGS. 2-1, 2-2, 2-3 and 2-4 are four diagrams of a BRBG;

FIG. 3 is a diagram illustrating BRBs forming a BRBG;

FIG. 4 is a flow chart of a resource management method provided by the invention;

DETAILED DESCRIPTION OF THE INVENTION

In wireless communication systems, the object of wireless resource management includes two aspects: efficient utilization of resources, and guarantee of communication quality. Normally, wireless resource management strategies are closely related to the underlying technologies. Different transmission technologies employ different resource allocations, which may reflect on the method of resource management. In addition, different technologies use different interference suppression and coordination methods, which may also reflect on the strategies of resource allocation. For example: in Frequency Division Multiple Access (FDMA) or Time Division Multiple Access (TDMA) systems, user differentiation and multiple access are realized by the allocation of time resource and the allocation of frequency resource; in Code Division Multiple Access (CDMA) systems, user differentiation and multiple access are realized by the allocation of channel resource.

Figure 1:
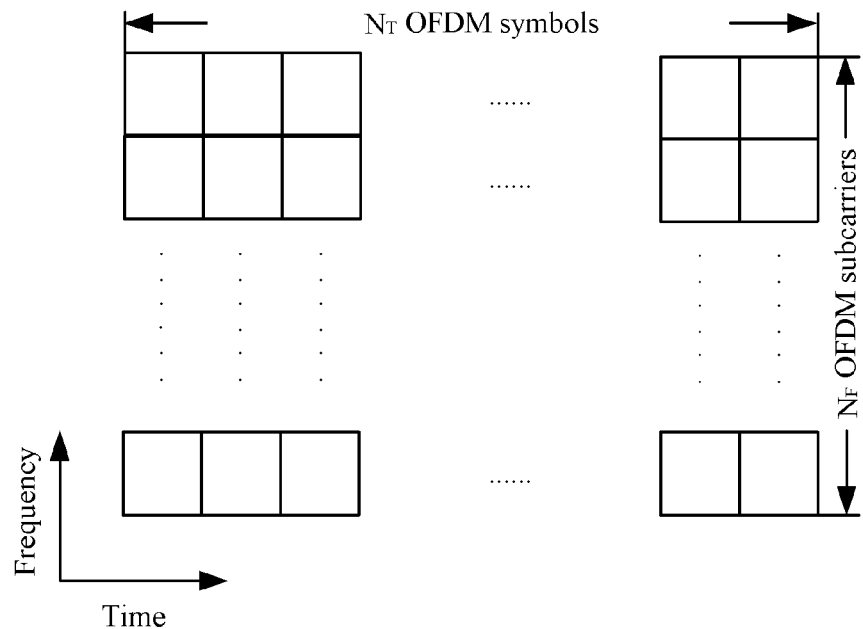
FIG. 1 is a structural diagram of a PRB in BRDMA.

In OFDM modulated systems, channel resource has a 2-dimensional time-frequency structure. In BRDMA, Physical Resource Block (PRB) is a basic time-frequency resource unit mapping the transmitted data to the physical layer, and also a time-frequency allocation unit. The structure of PRB is shown in FIG. 1. The PRB includes $N_T$ consecutive OFDM symbols in the time domain, and $N_F$ consecutive OFDM sub-carriers in the frequency domain. The PRB provides $N=N_T \times N_F$ time-frequency locations for transmitting signals, each time-frequency location transmitting one modulated symbol. As can be seen, a PRB takes part of the whole OFDM time-frequency resource, and the whole OFDM time-frequency resource includes one or more PRBs.

Normally, one or several types of PRB structure are defined in developing a communication system specification, and the definition of PRB is static and related to time slot structure, frame structure, sub-carrier interval, etc. The size of PRB does not change while the system is operating.

In BR-OFDM systems, BRB is a basic physical resource unit for block repeat modulation and has a fixed size. A BPB may be constituted by a PRB, or by multiple consecutive PRBs. A BRB may be formed by PRBs consecutive in the time domain, or by PRBs consecutive in the frequency domain, or by PRBs consecutive in both the time domain and the frequency domain. It should be noted, the PRB in BRDMA differs from the physical resource block in existing OFDM modulated systems. In practice the physical resource block in existing OFDM modulated systems may be used as the PRB of the invention, however, in some cases, the PRB in BRDMA may be customized without using the physical resource block in existing OFDM modulated systems as the basic time-frequency resource unit in BRDMA.

Figures 1, 2:
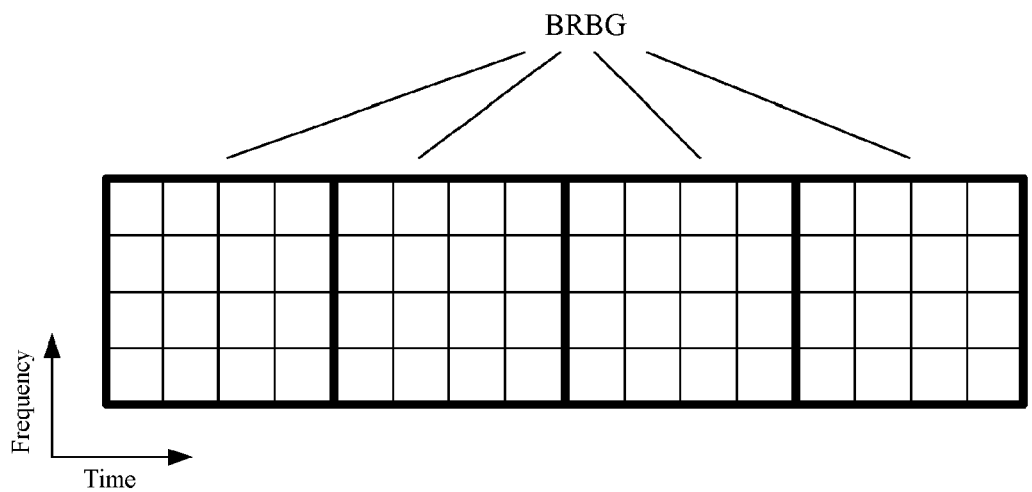
Figure 2:
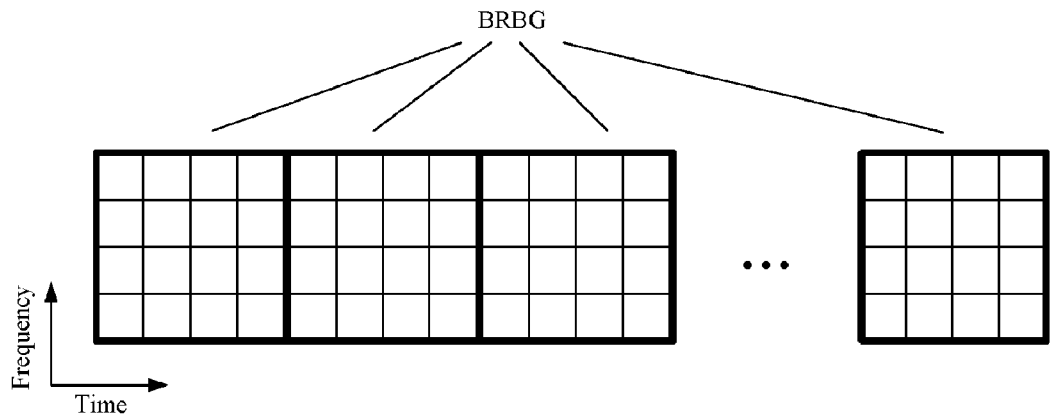

A group of BRBs are referred to as a Block repeat Resource Block Group (BRBG). A BRBG having BRBs repeating in only the time domain is referred to as a time domain BRBG, and FIGS. 2-1 and 2-2 are two diagrams of a time domain BRBG; a BRBG having BRBs repeating in only the frequency domain is referred to as a frequency domain BRBG, and FIGS. 2-3 and 2-4 are two diagrams of a frequency domain BRBG.

As can be seen, the BRBs forming a BRBG may be consecutive in the time domain and/or the frequency domain, or not consecutive. A BRBG having BRBs consecutive in the time domain can be referred to as a time domain continuous BRBG (shown in FIG. 2-1), a BRBG having BRBs consecutive in the frequency domain can be referred to as a frequency domain continuous BRBG (shown in FIG. 2-3). A BRBG having BRBs consecutive in both the time domain and the frequency domain can be referred to as a time-frequency continuous BRBG.

As can be seen, the RF of a BRBG is the number of modulation repetitions of the BRBG, which also indicates the number of BRBs for repeat modulation included in the BRBG; and multiple BRBGs have the same number of BRBs for repeat modulation as long as they have the same RF, even if at different time-frequency locations. Change of a RF of a BRBG means change of the number of BRBs included in the BRBG. If the RF of the BRBG increases, the number of BRBs included in the BRBG increases; if the RF of the BRBG decreases, the number of BRBs included in the BRBG decreases.

Figures 2, 3:
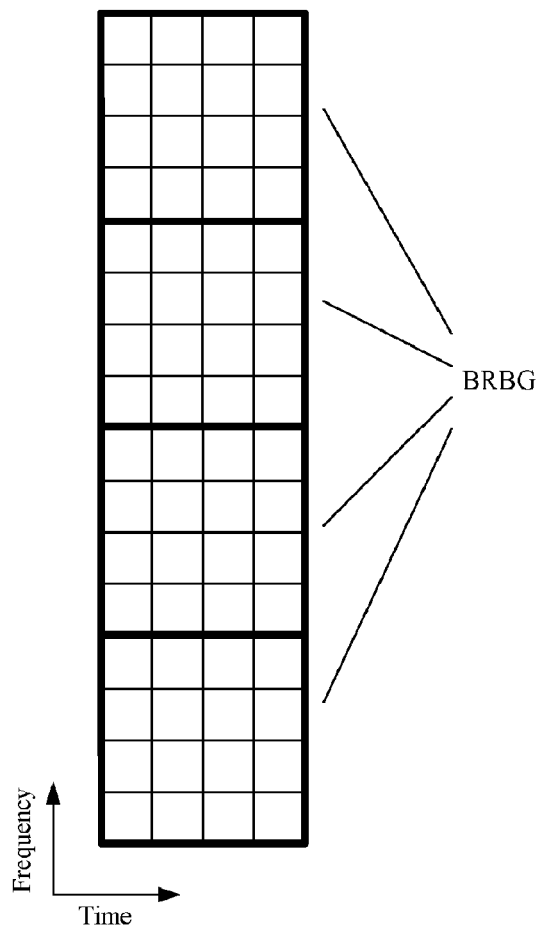
Figures 2, 3, 4:
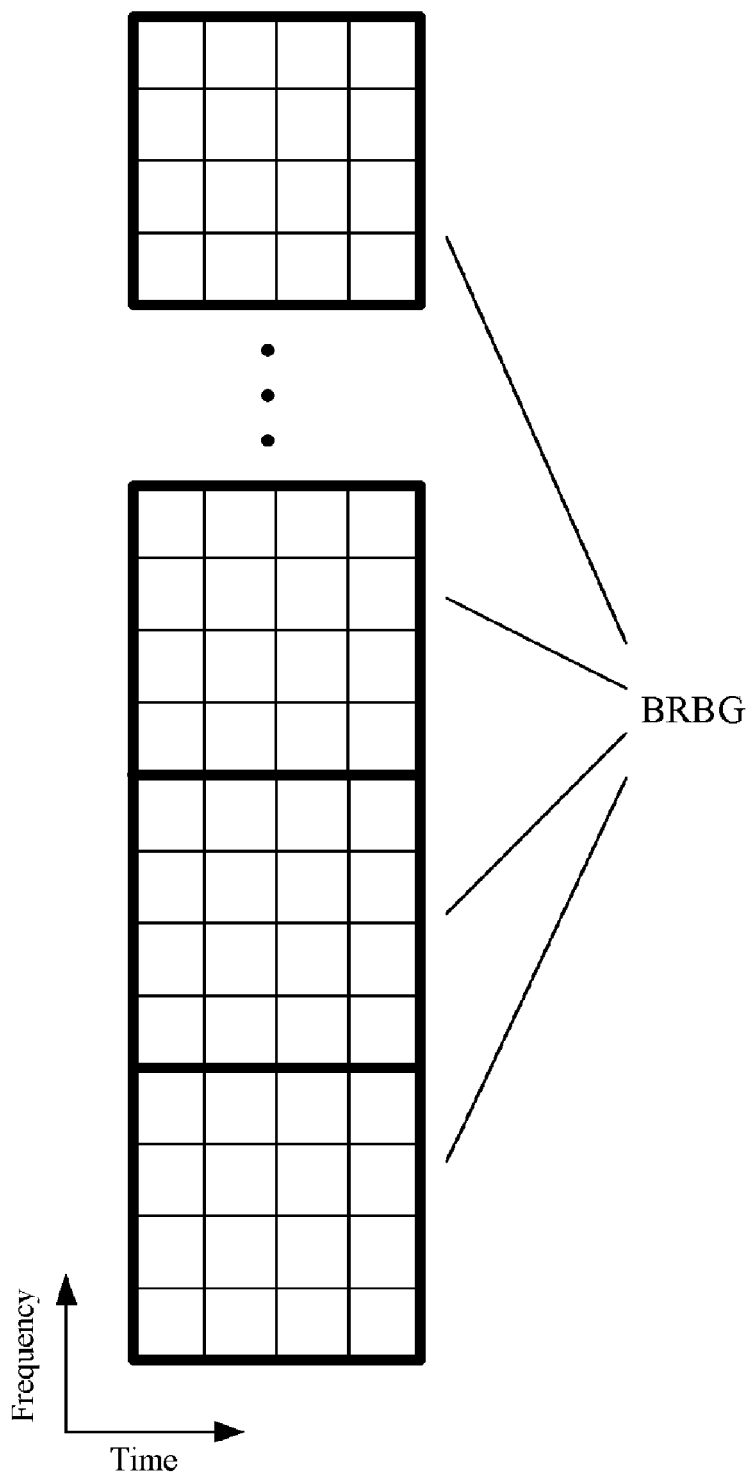
Figure 3:
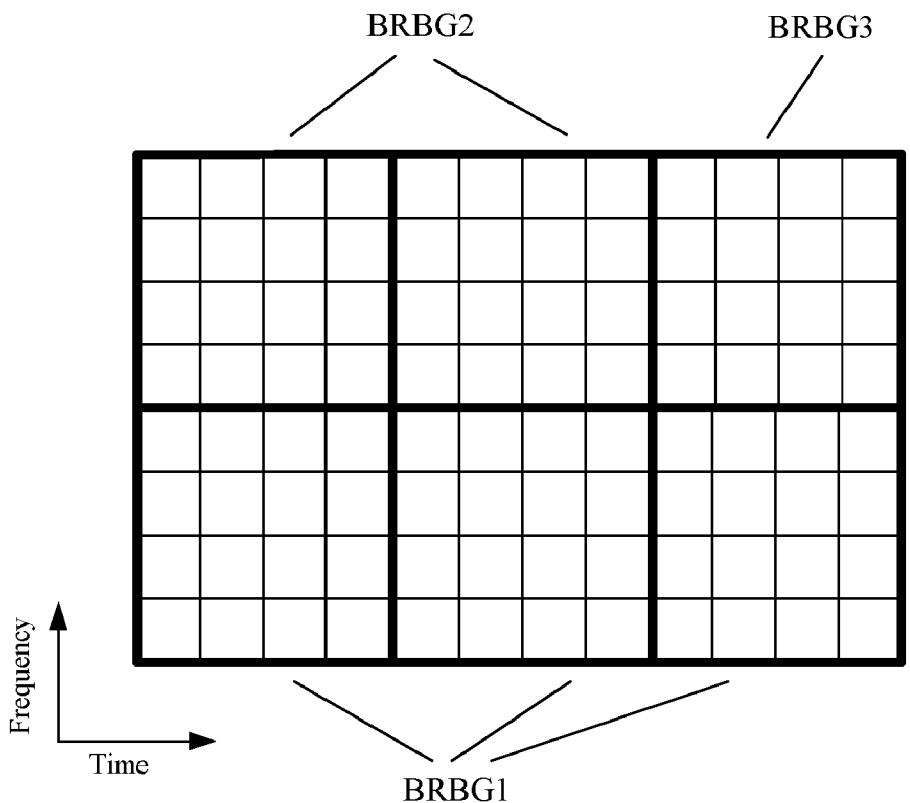
Figure 4:
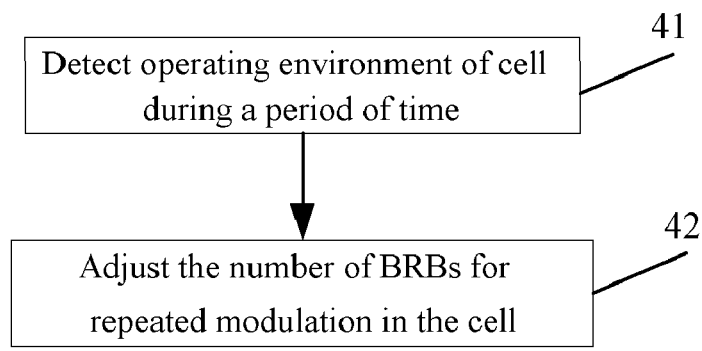

As illustrated in FIG. 3, six BRBs are divided in to three BRBGs. BRBG1 includes three BRBs and has a RF of 3; BRBG2 includes two BRBs and has a RF of 2; BRBG3 includes one BRB and has a RF of 1.

In allocation of time resource, according to user requirements on data rate and quality, time resource is allocated for users in BRBGs, a user may be allocated with one or more BRBGs. BRBGs allocated for different users may have identical RFs or different RFs. The management of time resource may also be performed in BRBGs.

As can be seen, available time resource in a cell is limited. When transmitting data in BRDMA, if the number of BRBs for repeat modulation of a block unit increases, as they are used in repeat modulation and transmission of the data of a user, communication reliability for the user can be improved, however, the number of block units that the cell can transmit at the same time will decrease accordingly, thereby reducing capacity of the cell. Therefore, communication reliability and cell capacity have to be coordinated with resource management.

In addition, to facilitate joint detection of adjacent cells, BRBG allocations of the cells should be the same. If BRBG allocation of a cell changes, its neighboring cells should be informed of the changed BRBG allocation of the cell, and update their BRBG allocations accordingly.

Particularly, in the event that BRBG allocation of a cell changes, the changed BRBG allocation may be informed to neighboring cells through a Radio Network Controller (RNC) or a core network, alternatively, the changed BRBG allocation may be informed to neighboring cells via an interface between base stations.

For a better understanding of a resource management method of the invention by those skilled in the art, the resource management method is described in details with reference to the embodiments below.

FIG. 4 illustrates a flow chart of a resource management method provided by the invention.

In step 41, an operating environment of a cell is detected in a period of time.

In step 42, the number of BRBs in BRBGs of the cell is adjusted according to the operating environment of the cell.

The operating environment of the cell may be represented by a parameter, which includes but is not limited to: operating load of the cell, or interference that the cell is subjected to. In performing resource management, particularly, the number of BRBs in BRBGs may be adjusted according to a parameter, or, by jointly considering multiple parameters.

When resource management is performed according to the operating load of the cell, the average value of the operating load over the period of time is used. First, the average of the operating load of the cell over the period of time is calculated, then, the obtained average is compared with two preset thresholds (upper limit of the load, lower limit of the load).

If the obtained average is larger than the upper limit of the load, it is indicated that the cell is busy, and BRBs in BRBGs should be released, so as to improve capacity of the cell and lower the load of the cell.

If the obtained average is less than the lower limit of the load, it is indicated that the cell has a lot idle resources, and the number of BRBs in BRBGs can be increased, so as to improve reliability of signal transmission.

When resource management is performed according to the interference that the cell is subjected to, the average value of the interference that the cell is subjected to over the period of time is used. First, the average of the interference that the cell is subjected to over the period of time is calculated, then, the obtained average is compared with two preset thresholds (upper limit of the interference, lower limit of the interference).

If the obtained average is larger than the upper limit the interference, it is indicated that the cell has severe external interference, and the number of BRBs in BRBGs should be increased, so as to improve reliability of signal transmission.

If the obtained average is less than the lower limit of the load, it is indicated that the cell has little external interference, and BRBs in BRBGs can be released, so as to improve capacity of the cell and lower the load of the cell.

Many methods are available for increasing the number of BRBs in BRBGs, and one of them is to increase the number of BRBs in BRBGs by increasing RFs of a part of the BRBGs.

In a cell, for users at the edge of the cell, because signal strength decreases and interference increases, reliability of signal transmission can be improved by using a BRBG having a larger RF; for users in the center of the cell, because signal strength increases and interference decreases, BRBGs having RF=1 may be used. Therefore, while allocating resources, BRBGs having RFs larger than 1 are a part of the whole BRBGs, and may be used for users at the edge of the cell; and the part of BRBGs having RF=1 may be used for users at the center of the cell. It should be noted, BRBGs having RF=1 include one BRB, therefore they are for normal data transmission, and are not used for repeat modulation.

Suppose the whole time-frequency resource is divided into eight BRBGs having RF=1, four BRBGs having RF=2, two BRBGs having RF=4, and one BRBG having RF=8.

To increase the number of BRBs in the BRBGs, we may increase only RFs of BRBGs having RF=1, for example: we may increase RFs of three BRBGs having RF=1 by 1. We may merge every two of six BRBGs having RF=1, and obtain three new BRBGs having RF=2. The adjusted time-frequency resource is: two BRBGs having RF=1, seven BRBGs having RF=2, two BRBGs having RF=4, and one BRBG having RF=8.

Figure 5:
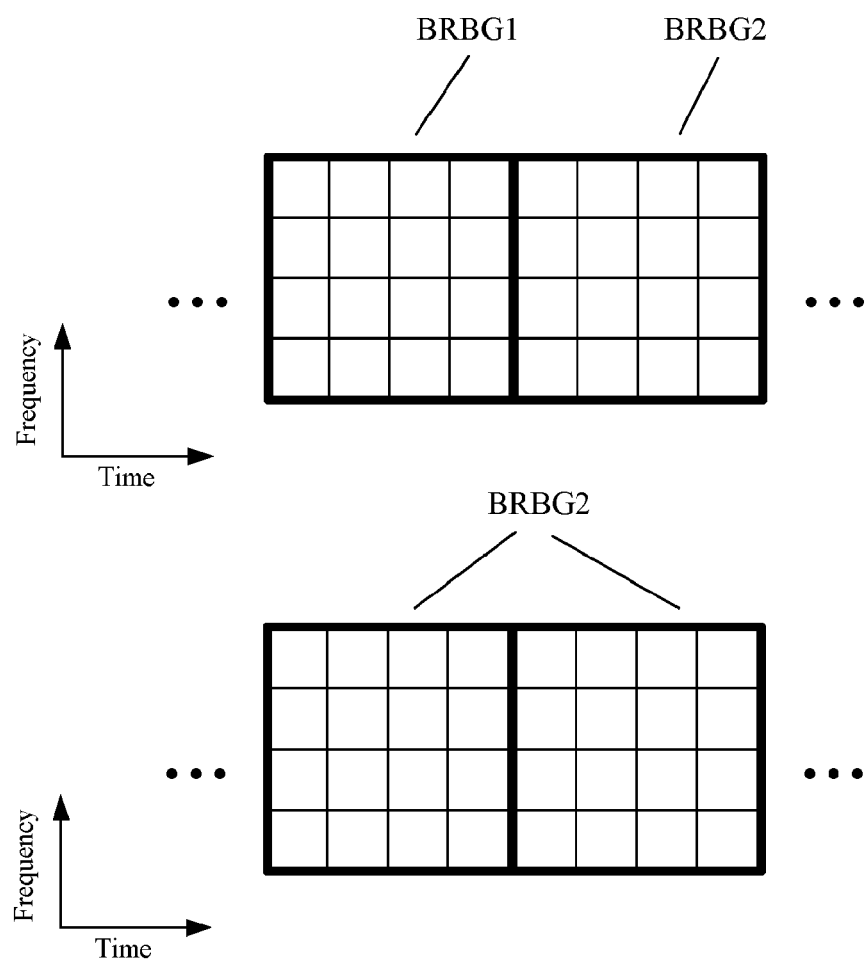
FIG. 5 is a diagram illustrating merging of two BRBGs.

FIG. 5 illustrates merging two BRBGs having RF=1 into one BRBG having RF=2. As shown in FIG. 5, it can be seen as merging BRBG1 having RF=1 into BRBG2 having RF=1 and obtaining a new BRBG2 having RF=2.

To increase the number of BRBs in the BRBGs, we may also increase RFs of BRBGs having RFs larger than 1. For example: we may increase RFs of BRBGs having RF=2, RF=4 and RF=8 by 1. Therefore, seven BRBGs having RF=1 are merged to those BRBGs having RFs larger than 1. And the adjusted time-frequency resource is: one BRBG having RF=1, two BRBGs having RF=3, two BRBGs having RF=5, and one BRBG having RF=9.

Alternatively, we may increase RFs of BRBGs having RF=4 and RF=8 by 2. Therefore, we may merge three BRBGs having RF=2 to the BRBGs having RFs larger than 2, or we may merge six BRBGs having RF=1 to the BRBGs having RFs larger than 2.

As can be seen, time-frequency resource of the system is limited, and it is not possible to increase RFs of all the BRBGs while maintaining the number of the BRBGs. RFs of a part of the BRBGs are increased, means that RFs of other part of the BRBGs are decreased. If RFs of a part of the BRBGs are lowered to zero, this part of BRBGs are removed. As the number of BRBGs decreases, the capacity of the cell decreases.

It should be noted, in BRDMA, a RF of a BRBG may correspond to a plurality of RC sequences, and the plurality of RC sequences can be referred to as a RC sequence group of the BRBG. If a BRBG is allocated to multiple users, multiple access can be realized based on the plurality of RC sequences of the BRBG.

A corresponding group of RC sequences may be pre-assigned for each RF. And in allocating BRBGs to users, we may select an available RC sequence from a group of RC sequences corresponding to the RF of the BRBG. Here, available RC sequences are RC sequences that are not assigned to users.

An advantage of the pre-assignment of RC sequences is, irrelevance or little relevance between the RC sequences can be guaranteed. Moreover, BRBGs having the same RF can correspond to the same RC sequence group. Therefore, the correspondence between RFs and RC sequence groups can be established. After being established, neighboring cells are informed of the correspondence between RFs and RC sequence groups, thereby enabling joint detection between cells.

If a RF of a BRBG is increased, the corresponding RC sequence group may be determined according to the increased RF, and the RC sequence group of the BRBG is updated accordingly.

For example, if a BRBG having RF=2 (which has two RC sequences) is adjusted to have RF=3, the number of RC sequences of its may be adjusted into three, accordingly. Alternatively, the number of RC sequences of the BRBG may not be adjusted if the RF is increased; however, this may lower utilization of the BRBG.

It should also be noted, a BRBG may correspond to M ($M \geq 1$, M being an integer) RC sequences, however, for irrelevance or little relevance between the RC sequences, it is better that $M \leq RF$, that is, the number of RC sequences corresponding to a BRBG should be less than its repeat factor.

Therefore, there are many possible solutions to improve RFs of a part of the BRBGs, and in practical resource management, we may choose from the solutions based on a specific requirement or strategy. Further description is omitted here.

Methods for releasing BRBs in BRBGs are described below.

Many methods are available for releasing BRBs in a part of, or all of BRBGs, and one of them is: to reduce the number of BRBs in BRBGs by lowering RFs in a part of the BRBGs.

Suppose the whole time-frequency resource is divided into: eight BRBGs having RF=1, four BRBGs having RF=2, two BRBGs having RF=4, and one BRBG having F=8.

To release BRBs in the BRBGs, we may lower only RFs of BRBGs having RF=2, for example: we may divide four BRBGs having RF=2 into eight BRBGs having RF=1. The adjusted time-frequency resource is: sixteen BRBGs having RF=1, two BRBGs having RF=4, and one BRBG having RF=8.

Alternatively, we may lower the RF of the BRBG having the largest RF. For example: we may divide the BRBG having RF=8 into eight BRBGs having RF=1. Therefore, the adjusted time-frequency resource is: sixteen BRBGs having RF=1, four BRBGs having RF=2, and two BRBGs having RF=4.

Alternatively, we may lower RFs of all BRBGs having a RF larger than 1. For example, we may divide BRBGs having RF=2, BRBGs having RF=4 and BRBGs having RF=8, and lower their RFs to 1. Therefore, the adjusted time-frequency resource is thirty-two BRBGs having RF=1.

It should be noted, if a RF of a BRBG is lowered, the corresponding RC sequence group may be determined according to the lowered RF, and the RC sequence group of the BRBG is updated accordingly.

For example, if a BRBG having RF=3 (which has three RC sequences) is adjusted to have RF=2, the number of RC sequences of the BRBG may be adjusted into two, accordingly. Alternatively, the number of RC sequences of the BRBG may not be adjusted if the RF is lowered; however, this may result in relevance between RC sequences and disadvantage for BRDMA.

For a newly introduced BRBG, the RC sequence group of the BRBG may be determined based on the RC sequence group corresponding to the RF of the BRBG.

It should also be noted, there are many possible solutions to lower RFs of a part of BRBGs, and in practical resource management, we may choose from the solutions based on a specific requirement or strategy. Further description is omitted here.

As can be seen from the resource management flow chart of FIG. 4, the adjustment to BRBGs is done in intervals, that is, the detection time for operating environment of the cell. The detection time is configured based on specific circumstances, may be long, medium or short. If the detection time is set to be long, or infinitely long, the adjustment period of the BRBG will be long, or the BRBG will be static, without any adjustment. If the detection time is set to be short, the adjustment frequency of the BRBG will be quick, or even close to real-time adjustment.

An applicant of the resource management method provided by the invention is described hereinafter with reference to a specific scenario.

Below is a preferred application of the method under the scenario where the load of the cell is low:

If the load of the network is low, by using the resource management method provided by the invention, the configuration of BRBGs can be changed, and idle resources can be allocated to users, thereby improving service quality and reliability for users, and lowering complexity of scheduling.

Below is another application of the method under the scenario of hotspots or isolated spots:

For a hotspot or an isolated spot, inter-cell interference is not the most important factor, and the adjustment to BRBGs is mainly to improve communication reliability and enhance coverage. At the edge of the cell, detection ability of signals can be improved by increasing RFs of BRBGs. At the center of the cell, the throughout of the cell can be improved by lowering RFs of BRBGs.

Figure 6:
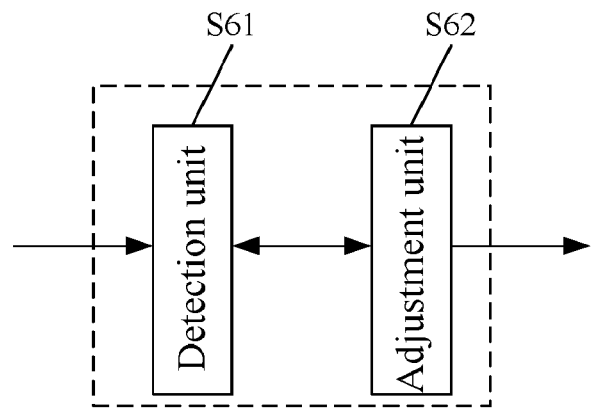
FIG. 6 is a diagram of a resource management device provided by the invention.

Based on the above resource management method, the invention also provides a BRDMA based resource management device. FIG. 6 illustrates a diagram of the resource management device.

The resource management device shown in FIG. 6 includes a detection unit S61 and an adjustment unit S62.

The detection unit S61 is adapted to detect an operating environment of the cell during a period of time, the adjustment unit S62 is adapted to adjust the number of BRBs in BRBGs of the cell according to the operating environment of the cell detected by the detection unit S61.

The operating environment of the cell may be represented by a parameter, which includes but is not limited to: operating load of the cell, or interference that the cell is subjected to. In performing resource management, particularly, the number of BRBs in BRBGs may be adjusted according to a parameter, or, by jointly considering multiple parameters.

When resource management is performed according to the operating load of the cell, the average value of the operating load over the period of time is used. The detection unit S61 first calculates the average of the operating load of the cell over the period of time, then compares the obtained average with a preset upper limit of the load, and a preset lower limit of the load.

If the obtained average is larger than the upper limit of the load, it is indicated that the cell is busy, and BRBs in BRBGs should be released, so as to improve capacity of the cell and lower the load of the cell.

If the obtained average is less than the lower limit of the load, it is indicated that the cell has a lot idle resources, and the number of BRBs in BRBGs can be increased, so as to improve reliability of signal transmission.

When resource management is performed according to the interference that the cell is subjected to, the average value of the interference that the cell is subjected to over the period of time is used. The detection unit S61 first calculates the average of the interference that the cell is subjected to over the period of time, then compares the obtained average with a preset upper limit of the interference, and a preset lower limit of the interference.

If the obtained average is larger than the upper limit the interference, it is indicated that the cell has severe external interference, and the number of BRBs in BRBGs should be increased, so as to improve reliability of signal transmission.

If the obtained average is less than the lower limit of the load, it is indicated that the cell has little external interference, and BRBs in BRBGs can be released, so as to improve capacity of the cell and lower the load of the cell.

Many methods are available for the adjustment unit S62 to increase the number of BRBs in BRBGs, and one of them is to increase the number of BRBs in BRBGs by increasing RFs of a part of the BRBGs.

Suppose the whole time-frequency resource is divided into: eight BRBGs having RF=1, four BRBGs having RF=2, two BRBGs having RF=4, and one BRBG having RF=8.

To increase the number of BRBs in the BRBGs, the adjustment unit S62 may increase only RFs of BRBGs having RF=1, for example: RFs of three BRBGs having RF=1 may be increased by 1. Every two of six BRBGs having RF=1 may be emerged, and three new BRBGs having RF=2 may be obtained. The adjusted time-frequency resource is: two BRBGs having RF=1, seven BRBGs having RF=2, two BRBGs having RF=4, and one BRBG having RF=8.

To increase the number of BRBs in the BRBGs, the adjustment unit S62 may also increase RFs of BRBGs having RFs larger than 1. For example: RFs of BRBGs having RF=2, RF=4 and RF=8 may be increased by 1. Therefore, seven BRBGs having RF=1 are merged to those BRBGs having RFs larger than 1. And the adjusted time-frequency resource is: one BRBG having RF=1, two BRBGs having RF=3, two BRBGs having RF=5, and one BRBG having RF=9.

Alternatively, the adjustment unit S62 may increase RFs of BRBGs having RF=4 and RF=8 by 2. Therefore, three BRBGs having RF=2 may be merged to the BRBGs having RFs larger than 2, or six BRBGs having RF=1 may be merged to the BRBGs having RFs larger than 2.

If a RF of a BRBG is increased, the RC sequence group according to the increased RF may be determined, and the RC sequence group of the BRBG is updated accordingly. In this case, the device shown in FIG. 6 further includes a first RC sequence update unit for updating a RC sequence group of a BRBG having an increased RF.

For example, if a BRBG having RF=2 (which has two RC sequences) is adjusted to have RF=3, the number of RC sequences of its may be adjusted into three, accordingly. Alternatively, the number of RC sequences of the BRBG may not be adjusted if the RF is increased; however, this may lower utilization of the BRBG.

It should also be noted, a BRBG may correspond to M ($M \geq 1$, M being an integer) RC sequences, however, for irrelevance or little relevance between the RC sequences, it is better that $M \leq RF$, that is, the number of RC sequences corresponding to a BRBG should be less than its repeat factor.

Many methods are available for releasing BRBs in a part of, or all of BRBGs, and one of them is: to reduce the number of BRBs in BRBGs by lowering RFs in a part of the BRBGs.

Suppose the whole time-frequency resource is divided into: eight BRBGs having RF=1, four BRBGs having RF=2, two BRBGs having RF=4, and one BRBG having F=8.

To release BRBs in the BRBGs, the adjustment unit S62 may lower only RFs of BRBGs having RF=2, for example: four BRBGs having RF=2 may be divided into eight BRBGs having RF=1. The adjusted time-frequency resource is: sixteen BRBGs having RF=1, two BRBGs having RF=4, and one BRBG having RF=8.

Alternatively, the adjustment unit S62 may lower the RF of the BRBG having the largest RF. For example: the BRBG having RF=8 may be divided into eight BRBGs having RF=1. Therefore, the adjusted time-frequency resource is: sixteen BRBGs having RF=1, four BRBGs having RF=2, and two BRBGs having RF=4.

Alternatively, the adjustment unit may lower RFs of all BRBGs having a RF larger than 1. For example, BRBGs having RF=2, BRBGs having RF=4 and BRBGs having RF=8 are divided, and their RFs are lowered to 1. Therefore, the adjusted time-frequency resource is thirty-two BRBGs having RF=1.

It should be noted, if a RF of a BRBG is lowered, the corresponding RC sequence group may be determined according to the lowered RF, and the RC sequence group of the BRBG is updated accordingly. In this case, the device shown in FIG. 6 further includes a second RC sequence update unit for updating a RC sequence group of a BRBG having a lowered RF.

For example, if a BRBG having RF=3 (which has three RC sequences) is adjusted to have RF=2, the number of RC sequences of the BRBG may be adjusted into two, accordingly. Alternatively, the number of RC sequences of the BRBG may not be adjusted if the RF is lowered; however, this may result in relevance between RC sequences and disadvantage for BRDMA.

For a newly introduced BRBG, the RC sequence group of the BRBG may be determined based on the RC sequence group corresponding to the RF of the BRBG.

As can be seen from the resource management device shown in FIG. 6, the adjustment to BRBGs is done in intervals, that is, the detection time for operating environment of the cell. The detection time is configured based on specific circumstances, may be long, medium or short. If the detection time is set to be long, or infinitely long, the adjustment period of the BRBG will be long, or the BRBG will be static, without any adjustment. If the detection time is set to be short, the adjustment frequency of the BRBG will be quick, or even close to real-time adjustment.

Following the description of the resource management method and device provided by the invention, a BRDMA based resource allocation is described hereinafter.

Figure 7:
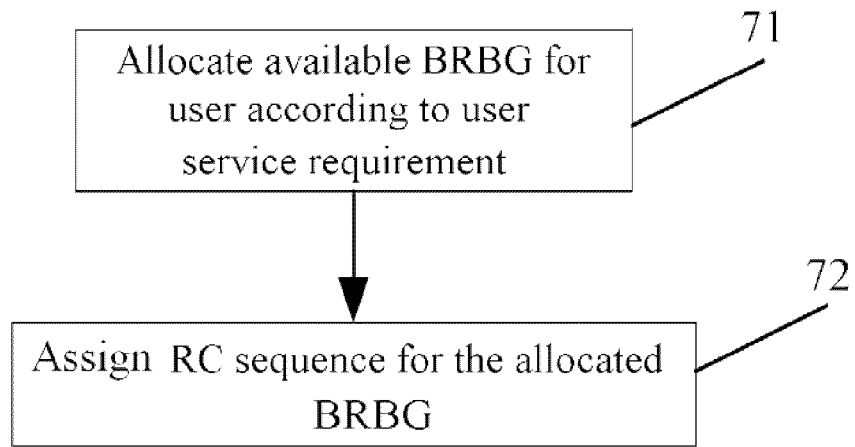
FIG. 7 is a flow chart of a resource allocation method provided by the invention.

FIG. 7 illustrates a BRDMA based resource allocation procedure.

In step 71, available BRBGs are allocated for a user.

The step of allocating a BRBG includes: selecting a BRBG having a RF meeting a service requirement of the user, and allocating the selected BRBG.

The service requirement of the user may be a requirement of service date rate, or a Quality of Service (QoS) requirement. In practice, service requirements other than these two may be considered.

Upon obtaining the service requirement of the user, time-frequency resource that the service requirement needs and the number of modulation repetitions are determined based on the service requirement; then, a suitable BRBG may be selected based on the required time-frequency resource and the number of modulation repetitions.

Suppose the number of modulation repetitions is determined to be 4 based on a service date rate requirement or a QoS requirement of a user, the suitable BRBG for the service requirement of the user is a BRBG having RF=4. Therefore, an available BRBG having RF=4 is to be allocated to the user.

Here, an available BRBG refers to a BRBG having an available RC sequence.

As a BRBG may correspond to multiple RC sequences, when the BRBG is allocated to multiple users, multiple access can be realized by assigning different RC sequences for different users. Therefore, while allocating a BRBG for a user, we have to consider whether the BRBG has an available RC sequence. If all RC sequences of the BRBG are already assigned for other users, because we can not assign a RC sequence for the user even if we allocate the BRBG for the user, the BRBG is considered unavailable.

After allocating an available BRBG for the user, a RC sequence is assigned for the allocated BRBG in step 72.

After a BRBG is allocated for the user, while assigning a RC sequence for the user, we may select an available RC sequence from a RC sequence group corresponding to the RF of the BRBG and assign it to the user.

In addition, the step of allocating a BRBG in step 71 includes: selecting a BRBG having a RF meeting the service requirement of the user, and allocating the selected BRBG. This method of allocation may fully utilize resources. However, in practice, it is likely that there is no BRBG having a RF that meets the user service requirement among available BRBGs. In this case, resource may be not allocated for the user, however, it is not recommended.

If there is no BRBG having a RF that meets the user service requirement among available BRBGs, other methods may be used for allocating a BRBG for the user.

A first method includes: selecting an available BRBG having a RF higher than the user service requirement, and allocating the selected BRBG to the user.

Suppose the number of modulation repetitions is determined to be 2 based on a service data rate requirement or QoS requirement of the user, the BRBG that meets the user service requirement is a BRBG having RF=2. If there is no BRBG having RF=2 among available BRBGs, an available BRBG having a RF larger than 2 is selected.

As can be seen, time-frequency resource is wasted using the first method for allocating a BRBG. To save time-frequency resource and improve utilization of time-frequency resource, a second method may be used.

The second method includes: selecting an available BRBG having a RF higher than the user service requirement, lowering the RF of the selected BRBG to obtain a BRBG having a RF meeting the user service requirement, and allocating the obtained BRBG.

Suppose the number of modulation repetitions is determined to be 2 based on a service data rate requirement or QoS requirement of the user, the BRBG that meets the user service requirement is a BRBG having RF=2. If there is no BRBG having RF=2 among available BRBGs, an available BRBG having a RF larger than 2 is selected. Suppose the selected BRBG has a RF of 5, the RF of the BRBG is lowered to 2, that is, the BRBG is divided into three BRBGs, and an obtained BRBG having RF=2 is allocated to the user.

A third method includes: increasing a RF of a BRBG to obtain a BRBG having a RF meeting the user service requirement, and allocating the obtained BRBG.

Suppose the number of modulation repetitions is determined to be 5 based on a service data rate requirement or QoS requirement of the user, the BRBG that meets the user service requirement is a BRBG having RF=5. If there is no BRBG having RF=5 among available BRBGs, the RF of an available BRBG having RF=3 is increased to 5, that is, a BRBG having RF=2 is merged to the BRBG having RF=3, and a BRBG having RF=5 is obtained.

A fourth method includes: selecting a plurality of BRBGs, the sum of RFs of which meets the user service requirement, and allocating the plurality of BRBGs.

Suppose the number of modulation repetitions is determined to be 5 based on a service data rate requirement or QoS requirement of the user, the BRBG that meets the user service requirement is a BRBG having RF=5. If there is no BRBG having RF=5 among available BRBGs, we may allocate an available BRBG having RF=3 and an available BRBG having RF=2 for the user.

It should be noted, the difference between the third method and the fourth method lies in that:

The essential of the third method is to combine multiple BRBGs into one BRBG and allocate it for the user, and there will be only one assigned RC sequence.

The essential of the fourth method is to repeatedly transmit by using multiple BRBGs. In this case, we do not combine the BRBGs, and accordingly, there will be multiple assigned RC sequences. While assigning multiple RC sequences, the RC sequences may be concatenated in the same order as the BRBGs are allocated. Seen from the receiver, it is equivalent to multiple BRBGs combined into a new BRBG for repeat transmission, and multiple available RC sequences concatenated in the same order as the BRBGs are allocated to be used as an extended RC sequence.

For example, if an available BRBG having RF=3 (BRBG1) and an available BRBG having RF=2 (BRBG2) are allocated for a user, we suppose a selected RC sequence for BRBG1 is $\{1, 0, 1\}$, and a selected RC sequence for BRBG2 is $\{1, 0\}$, the order in which the BRBGs are allocated is BRBG1, and BRBG2, therefore, after the concatenation of the two RC sequences, we obtain a RC sequence $\{1, 0, 1, 1, 0\}$. If the order in which the BRBGs are allocated is BRBG2, and BRBG1, then the obtained RC sequence after the concatenation is $\{1, 0, 1, 0, 1\}$.

As can be seen, the four methods above of resource allocation may be used as auxiliary resource allocation methods in the case where an available BRBG having a RF meeting the user service requirement does not exist, or may be used directly as independent resource allocation methods. If the four methods above are used as independent resource allocation methods, we do not have to pre-determine whether there is an available BRBG having a RF that meets the user service requirement.

After the description of the resource allocation process with reference to the flow chart of FIG. 7, it should be noted that the resource allocation method may be used for allocating downlink time-frequency resource, or may be used for allocating uplink time-frequency resource.

In allocation of uplink time-frequency resource, the Peak-to-Average Power Ratio (PAPR) of the signal transmitted by the terminal should be considered, in order to improve the transmission efficiency of the terminal. If BRBGs having BRBs repeating in only the frequency domain are included in the allocated BRBGs, the PAPR of the transmitted signal will be deteriorated. Therefore, in allocation of uplink time-frequency resource, time domain BRBGs are preferred. In the limited situation where a frequency domain BRBG has to be allocated, BRBs included in the BRBG have to be consecutive in the frequency domain, that is, the uplink signal after block repeat is transmitted in a continuous frequency band, not a discrete frequency band.

Figure 8:
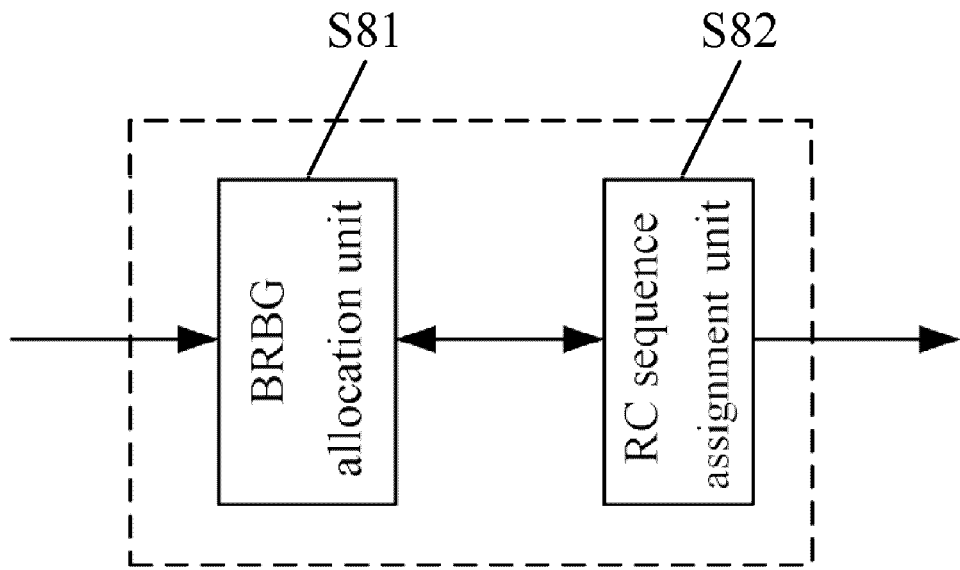
FIG. 8 is diagram of a resource allocation device provided by the invention.

Based on the resource allocation method above, the invention also provide a BRDMA based resource allocation device, and FIG. 8 illustrates a diagram of the resource allocation device.

The resource allocation device of FIG. 8 includes a BRBG allocation unit S81 and a RC sequence assignment unit S82.

The BRBG allocation unit S81 is adapted to allocate available BRBGs according to a service requirement of a user, and the RC sequence assignment unit S82 is adapted to assign a RC sequence for the BRBG.

The BRBG allocation unit S81 selects a BRBG having a RF that meets the service requirement of the user, and allocates the selected BRBG.

The service requirement of the user may be a requirement of service data rate, or a Quality of Service (QoS) requirement. In practice, service requirements other than these two may be considered.

Upon obtaining the service requirement of the user, the BRBG allocation unit S81 may determines time-frequency resource to be taken and the number of modulation repetitions based on the service requirement; then selects a suitable BRBG based on the required time-frequency resource and the number of modulation repetitions.

Suppose the number of modulation repetitions is determined to be 4 based on a service data rate requirement or a QoS requirement of the user, the suitable BRBG for the service requirement of the user is a BRBG having RF=4. Therefore, the BRBG allocation unit S81 selects an available BRBG having RF=4 and allocates it for the user.

After allocating an available BRBG for the user, the RC sequence assignment unit S82 selects an available RC sequence from a RC sequence group corresponding to the RF of the BRBG and assign it for the user.

In addition, the step of the allocation unit S81 allocating a BRBG includes: selecting a BRBG having a RF meeting the service requirement of the user, and allocating the selected BRBG. This method of allocation may fully utilize resources. However, in practice, it is likely that there is no BRBG having a RF that meets the user service requirement among available BRBGs. In this case, resource may be not allocated for the user, however, it is not recommended. Therefore, a determination unit may be added to the device shown in FIG. 8, for determining whether a BRBG having a RF that meets the service requirement of the user exists among the available BRBGs.

Before the allocation unit S81 allocates a BRBG, the determination unit determines. If there is a BRBG having a RF meeting the service requirement of the user among the available BRBGs, the allocation unit S81 is triggered to allocate. If there is no BRBG having a RF meeting the service requirement of the user among the available BRBGs, other operations may be triggered.

If there is no BRBG having a RF that meets the user service requirement among available BRBGs, other methods may be used for allocating a BRBG for the user.

A first allocation unit may be added to the device of FIG. 8, which is adapted to, if there is no BRBG having a RF that meets the user service requirement among available BRBGs, be triggered by the determination unit to select a BRBG having a RF higher than the user service requirement, and allocating the selected BRBG.

Suppose the number of modulation repetitions is determined to be 2 based on a service data rate requirement or QoS requirement of the user, the BRBG that meets the user service requirement is a BRBG having RF=2. If there is no BRBG having RF=2 among available BRBGs, the first allocation unit may select an available BRBG having a RF larger than 2 and allocate it for the user.

Alternatively, a second allocation unit may be added to the device of FIG. 8, which is adapted to, if there is no BRBG having a RF that meets the user service requirement among available BRBGs, be triggered by the determination unit to lower the RF of a BRBG having a RF higher than the user service requirement to obtain a BRBG having a RF meeting the user service requirement, and allocate the obtained BRBG.

Suppose the number of modulation repetitions is determined to be 2 based on a service data rate requirement or QoS requirement of the user, the BRBG that meets the user service requirement is a BRBG having RF=2. If there is no BRBG having RF=2 among available BRBGs, the second allocation unit may lower the RF of an available BRBG having a RF larger than 2 (e.g. RF=5) to 2, that is, the BRBG is divided into three BRBGs, and an obtained BRBG having RF=2 is allocated to the user.

Alternatively, a third allocation unit may be added to the device of FIG. 8, which is adapted to, if there is no BRBG having a RF that meets the user service requirement among available BRBGs, be triggered by the determination unit to increase a RF of a BRBG to obtain a BRBG having a RF meeting the user service requirement, and allocates the obtained BRBG.

Suppose the number of modulation repetitions is determined to be 5 based on a service data rate requirement or QoS requirement of the user, the BRBG that meets the user service requirement is a BRBG having RF=5. If there is no BRBG having RF=5 among available BRBGs, the third allocation unit may increase the RF of an available BRBG having RF=3 to 5, that is, a BRBG having RF=2 is merged to the BRBG having RF=3, and a BRBG having RF=5 is obtained.

Alternatively, a fourth allocation unit may be added to the device of FIG. 8, which is adapted to, if there is no BRBG having a RF that meets the user service requirement among available BRBGs, be triggered by the determination unit to select a plurality of BRBGs, the sum of RFs of which meets the user service requirement, and allocate the plurality of BRBGs.

Suppose the number of modulation repetitions is determined to be 5 based on a service data rate requirement or QoS requirement of the user, the BRBG that meets the user service requirement is a BRBG having RF=5. If there is no BRBG having RF=5 among available BRBGs, the fourth allocation unit may allocate an available BRBG having RF=3 and an available BRBG having RF=2 for the user.

After the fourth allocation unit allocates multiple BRBGs to the user, the RC sequence assignment unit S82 selects multiple available RC sequences from RC sequences corresponding to RFs of the allocated multiple BRBGs, concatenates the selected RC sequences in the same order as the BRBGs are allocated, obtains a concatenated RC sequence, and assigns the concatenated RC sequence.

For example, if the fourth allocation unit assigns an available BRBG having RF=3 (BRBG1) and an available BRBG having RF=2 (BRBG2) for the user, we suppose the selected RC sequence for BRBG1 is {1, 0, 1}, and the selected RC sequence for BRBG2 is {1, 0}, the order in which the BRBGs are allocated is BRBG1, and BRBG2, therefore, after the RC sequence assignment unit concatenates the two RC sequences, the obtained RC sequence is {1, 0, 1, 1, 0}. If the order in which the BRBGs are allocated is BRBG2, and BRBG1, then the obtained RC sequence after the concatenation is {1, 0, 1, 0, 1}.

As can be seen, the first allocation unit, the second allocation unit, the third allocation unit, and the fourth allocation unit above may be used as an auxiliary resource allocation unit in the case where an available BRBG having a RF meeting the user service requirement does not exist, or may be used directly as independent resource allocation unit. If the four resource allocation units above are used as independent resource allocation units, it is not needed to pre-determine whether there is an available BRBG having a RF that meets the user service requirement, thereby omitting the determination unit.

It should be noted that the resource allocation device may be used for allocating downlink time-frequency resource, or may be used for allocating uplink time-frequency resource.

In allocation of uplink time-frequency resource, the PAPR of the signal transmitted by the terminal should be considered, in order to improve the transmission efficiency of the terminal. If BRBGs having BRBs repeating in only the frequency domain are included in the allocated BRBGs, the PAPR of the transmitted signal will be deteriorated. Therefore, in allocation of uplink time-frequency resource, time domain BRBGs are preferred. In the limited situation where a frequency domain BRBG has to be allocated, BRBs included in the BRBG have to be consecutive in the frequency domain, that is, the uplink signal after block repeat is transmitted in a continuous frequency band, not a discrete frequency band.

Those skilled in the art would understand that the exemplary method steps and device units described in the embodiments may be implemented with electronic hardware, software, or both. In order to illustrate the exchangeability between hardware and software, the exemplary steps and units above are described generally by their functions. Whether the functions are realized with hardware of software depends on particular applications and design constraints in realizing the system. Those skilled in the art would understand that various methods are available for realizing the described functions for each particular application, and the realization should not be considered departing from the scope of the invention.

By using general-purpose processors, Digital Signal Processers (DSP), Application-Specific Integrated Circuit (ASIC), Field-Programmable Gate Array (FPGA) or other programmable logic devices, separate gates or transistor logic, separate hardware elements or any combination of them, exemplary units described in the embodiments can be realized or implemented. The genera-purpose processor may be a microprocessor, however, in other cases, the processor may be any general processor, controller, microcontroller, or state machine. The processor may also be implemented as a combination of computing devices, e.g. a combination of DSP and microprocessor, multiple microprocessors, one or more microprocessors combined with a DSP core, or any other structures of this type.

The steps of methods described in the embodiments may be implemented with hardware, a software module executed by a processor, or a combination of them. The software module may exist in RAM, flash memory, ROM, EPROM, EEPROM, register, hard disk, portable hard disk, CD-ROM or any other form of storage medium known in the art. By coupling a typical storage medium with a processor, the processor can read information from the storage medium and read information into the storage medium. In an alternate embodiment, the storage medium may be part of the processor. The processor and the storage medium may exist in an ASIC, which exists in a workstation. In an alternate embodiment, the processor and the storage medium may exist as separate elements in a workstation.

According to the embodiments disclosed, those skilled in the art may realize or use the invention. As can be seen by those skilled in the art, various modification to the embodiments are possible, and the principle of which can be applied to other embodiments without departing from the scope and substance of the invention. The embodiments described above are preferred embodiments of the invention, and are not intended to limit the invention. Any modification, equivalent or alternation within the spirit and principle of the invention should be included in the protection scope of the invention.

The invention claimed is:

1. A resource allocation method based on Block Repeat Division Multiple Access, comprising:
   selecting a Block repeat Resource Block Group, BRBG, with a Repeat Factor, RF, meeting a service requirement of a user from available BRBGs,
   allocating the selected BRBG by a BRBG allocation unit;
   assigning a Repeat Code, RC, sequence for the selected BRBG;
   wherein the selected BRBG comprises a plurality of Block Repeat Blocks, BRBs, and the BRB is time-frequency resource taken by a repeat block unit;
   and wherein the method further comprises:
   if the available BRBGs do not comprise the BRBG with the RF meeting the service requirement of the user,
   lowering a RF of a BRBG with a RF higher than the service requirement of the user to obtain a BRBG with a RF meeting the service requirement of the user, and allocating the obtained BRBG; or
   increasing a RF of a BRBG to obtain a BRBG with a RF meeting the service requirement of the user, and allocating the obtained BRBG; or
   selecting a plurality of available BRBGs, the sum of RFs of which meets the service requirement of the user, and allocating the plurality of available BRBGs.

2. The method according to claim 1 wherein the step of selecting a plurality of available BRBGs, the sum of RFs of which meets the service requirement of the user, and allocating the plurality of available BRBGs comprises:
   selecting a plurality of available RC sequences from RC sequences corresponding to RFs of the allocated plurality of available BRBGs, concatenating the selected plurality of RC sequences in the same order as the plurality of BRBGs are allocated, to obtain a concatenated RC sequence, and assigning the concatenated RC sequence.

3. The method according to claim 1, wherein an available RC sequence is selected from a group of RC sequences corresponding to a RF of an allocated BRBG, and the selected RC sequence is assigned.

4. A resource allocation device based on Block Repeat Division Multiple Access, comprising:
   a Block repeat Resource Block Group, BRBG, allocation unit, adapted to select a BRBG, with a Repeat Factor, RF, meeting a service requirement of a user from available BRBGs, and allocate the selected BRBG, and
   a Repeat Code, RC, sequence assignment unit, adapted to assign a RC sequence for the BRBG;
   wherein the BRBG comprises a plurality of Block Repeat Blocks, BRBs, and the BRB is time-frequency resource taken by a repeat block unit;
   and wherein the device further comprises:
   a determination unit, adapted to determine whether the available BRBGs comprise the BRBG with the RF meeting the service requirement of the user; and to trigger the BRBG allocation unit to operate if the available BRBGs comprise the BRBG with the RF meeting the service requirement of the user;
   and wherein the device further comprises: a second allocation unit, adapted to lower a RF of a BRBG with a RF higher than the service requirement of the user to obtain a BRBG with a RF meeting the service requirement of the user, and allocate the obtained BRBG, when the available BRBGs do not comprise the BRBG with the RF meeting the service requirement of the user; or
   a third allocation unit, adapted to increase a RF of a BRBG to obtain a BRBG with a RF meeting the service requirement of the user, and allocate the obtained BRBG, when the available BRBGs do not comprise the BRBG with the RF meeting the service requirement of the user; or a fourth allocation unit, adapted to select a plurality of available BRBGs, the sum of RFs of which meets the service requirement of the user, and allocate the plurality of available BRBGs, when the available BRBGs do not comprise the BRBG with the RF meeting the service requirement of the user.

* * * * *